(12) United States Patent
Runde

(10) Patent No.: US 9,646,430 B2
(45) Date of Patent: May 9, 2017

(54) VEHICLE OPERATION MANAGEMENT SYSTEM WITH AUTOMATIC SEQUENCE DETECTION

(71) Applicant: Deere & Company, Moline, IL (US)

(72) Inventor: Jeffrey E. Runde, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 11 days.

(21) Appl. No.: 14/739,999

(22) Filed: Jun. 15, 2015

(65) Prior Publication Data

US 2016/0364924 A1    Dec. 15, 2016

(51) Int. Cl.
| | |
|---|---|
| *G08B 23/00* | (2006.01) |
| *B60Q 1/00* | (2006.01) |
| *G07C 5/08* | (2006.01) |
| *G05D 1/00* | (2006.01) |

(52) U.S. Cl.
CPC ......... *G07C 5/0816* (2013.01); *G05D 1/0016* (2013.01)

(58) Field of Classification Search
CPC .... A63B 69/12; G01C 21/3629; G08B 23/00; B60K 35/00; E02F 9/2025
USPC .................... 340/523, 996, 517, 438; 701/50
See application file for complete search history.

(56) References Cited

U.S. PATENT DOCUMENTS

| | | |
|---|---|---|
| 6,292,729 B2 | 9/2001 | Falck et al. |
| 7,739,015 B2 | 6/2010 | Senneff et al. |
| 2001/0016794 A1* | 8/2001 | Falck ............... A01B 63/00 701/50 |
| 2013/0311004 A1* | 11/2013 | Okamura ............ G05D 1/0033 701/2 |
| 2014/0343803 A1* | 11/2014 | Losch .................. G05D 1/0276 701/50 |
| 2015/0068177 A1* | 3/2015 | Harkcom ............... A01D 34/00 56/15.5 |
| 2015/0112554 A1* | 4/2015 | Vitali ..................... F16M 13/04 701/50 |
| 2015/0147147 A1* | 5/2015 | Uchiyama ................ E02F 3/32 414/687 |

(Continued)

FOREIGN PATENT DOCUMENTS

EP    1316868    6/2003

OTHER PUBLICATIONS

AGCO Corporation, "Fendt TV, Fendt Holiday Weeks 2015: still more fun for kids," article (2015) 2 pages, http://www.fendt.tv/en/home/fendt variotronic/fendt-variotronic-ti-headland-management 1383.aspx.

(Continued)

*Primary Examiner* — George Bugg
*Assistant Examiner* — Munear Akki
(74) *Attorney, Agent, or Firm* — Michael Best & Friedrich LLP

(57) ABSTRACT

An operation management system for a vehicle controllable by an operator to perform various vehicle actions, the system including a processor, a memory, and a human-machine interface. The processor is configured to record sequences of operator-initiated vehicle actions and compare the sequences. If at least two of the sequences contain the same operator-initiated vehicle actions, identify the at least two of the sequences as matching sequences, and communicate, by way of the human-machine interface, to the operator of the vehicle a suggested operating sequence based on the matching sequences.

8 Claims, 5 Drawing Sheets

(56) References Cited

U.S. PATENT DOCUMENTS

2016/0031447 A1* 2/2016 Kobayashi ........... G05B 19/042
  701/50

OTHER PUBLICATIONS

AGCO Corporation, "Tractors Service, Fendt Variotronic—Everything in the Right Place," article (2015) 1 page, http.//www.fendt.com/us/tractors fendtvariotronic varioterminal.asp.

AGCO Corporation, "Tractors Service, Fendt Variotronic," article (2015) 7 pages, http.//www.fendt.com/us/3901.asp.

CLAAS Tractors, "Axion 870-800, Your Benefits," article (2014) 4 pages, http.//www.claas.co.uk/products/tractors/axion870-800.

John Deere AG Management Solutions, "ITEC Pro Operator's Manual," manual (2013) pp. 1-94.

John Deere, "Headland Management System (HMS)," article (Nov. 15, 2007) 2 pages. http://salesmanual.deere.com/sales/salesmanual/en_NA/tractors/attachments/operator_station_and_controls/6000_7020sf/6000_7000sf_hms.html.

John Deere, "How is the Implement Management System (IMS) Programmed?" article (2013) 2 pages, http://www.deere.com/en_US/ag/servicesupport/tips/tractors/7000/pf_how_is_the_implement_system_programmed.

New Holland Agriculture, "T7 Series—Tier 4A, Take Control of More Than Just Your Tractor," article (2015) 3 pages.

Valtra, "U-Pilot Headland Management System Makes Headland Maneuvers Simple," article (Nov. 6, 2005) 1 page, hittp://archive-us.com/p./49659/2012-06-12/http://www.valtra.us/news/727.asp.

Von Hoyningen-Huene et al, "Tractor-Implement-Automation and its Application to a tractro-loader wagon combination," article (2010) pp. 171-185.

DE102016210544.2 German Search Report dated Jun. 27, 2016 (8 pages).

\* cited by examiner

VEHICLE OPERATION MANAGEMENT SYSTEM WITH AUTOMATIC SEQUENCE DETECTION

BACKGROUND

The present disclosure relates to a system for managing or controlling operational functions of a vehicle, such as the various functions which must be controlled as an agricultural tractor moves over terrain. As an agricultural tractor moves through a field, the operator will typically be required to perform many operations at the start and at the end of a crop row in addition to simply steering the tractor, such as raising or lowering the implement hitch, shifting the transmission, engaging or disengaging the PTO shaft, etc. The number and complexity of the tasks can cause operator fatigue and can result in operational errors being committed.

SUMMARY

An operation management system, which can simplify the tasks of an operator of a work vehicle, such as an agricultural tractor, automatically and continually detects operator initiated vehicle actions, detects a repeated sequence of actions, and offers to the operator a select sequence of actions for use in the current operation. The offered sequence of actions can be saved and replayed upon command. Automatically detecting and offering sequences to the operator relieves the operator from taking time to configure the vehicle's onboard sequence control system and from having to program or record a desired sequence into the system.

In one aspect, the disclosure provides an operation management system for a vehicle controllable by an operator to perform various vehicle actions, the system including a processor, a memory, and a human-machine interface. The processor is configured to record sequences of operator-initiated vehicle actions and compare the sequences. If at least two of the sequences contain the same operator-initiated vehicle actions, identify the at least two of the sequences as matching sequences, and communicate, by way of the human-machine interface, to the operator of the vehicle a suggested operating sequence based on the matching sequences.

In another aspect the disclosure provides a method of facilitating operation of a vehicle controllable by an operator to perform various vehicle actions. The method includes recording sequences of operator-initiated vehicle actions, and comparing the sequences. If two or more of the sequences contain the same operator-initiated vehicle actions, identifying the two or more of the sequences as matching sequences, and communicating, by way of the human-machine interface, to the operator of the vehicle a suggested operating sequence based on the matching sequences.

In another aspect the disclosure provides a vehicle controllable by an operator to perform various vehicle actions, the vehicle having an operation management system controllable by an operator to perform various vehicle actions, the system including a processor, a memory, and a human-machine interface. The processor is configured to record sequences of operator-initiated vehicle actions, and compare the sequences. If at least two of the sequences contain the same operator-initiated vehicle actions, identify the at least two of the sequences as matching sequences, and communicate, by way of the human-machine interface, to the operator of the vehicle a suggested operating sequence based on the matching sequences.

In another aspect the disclosure provides an operation management system for a vehicle controllable by an operator to perform various vehicle actions, the system including a processor, a memory, and a human-machine interface. The processor is configured to record sequences of operator-initiated vehicle actions, record a distance value associated with each vehicle action relative to a previous vehicle action in the sequence, and generate a new sequence beginning with each vehicle action.

In another aspect the disclosure provides a method of facilitating operation of a vehicle controllable by an operator to perform various vehicle actions. The method includes recording sequences of operator-initiated vehicle actions, recording a distance value associated with each vehicle action relative to a previous vehicle action in the sequence, and generating a new sequence beginning with each vehicle action.

In another aspect the disclosure provides an operation management system for a vehicle controllable by an operator to perform various vehicle actions, the system including a processor, a memory, and a human-machine interface. The processor is configured to receive a first sequence of a predetermined number of operator initiated vehicle actions, each operator initiated vehicle action corresponding to an operational response of the vehicle, receive a second sequence of the predetermined number of operator initiated vehicle actions, and compare the operator initiated vehicle actions of the first and second sequences. If the operator initiated vehicle actions of the second sequence correspond to the operator initiated vehicle actions of the first sequence, identify an operational sequence of the vehicle based on at least one of the first or second sequences.

In another aspect the disclosure provides a method of facilitating operation of a vehicle controllable by an operator to perform various vehicle actions. The method including receiving a first sequence of a predetermined number of operator initiated vehicle actions, each operator initiated vehicle action corresponding to an operational response of the vehicle, receiving a second sequence of the predetermined number of operator initiated vehicle actions, comparing the operator initiated vehicle actions of the first and second sequences, and if the operator initiated vehicle actions of the second sequence correspond to the operator initiated vehicle actions of the first sequence, identifying an operational sequence of the vehicle based on at least one of the first or second sequences.

In another aspect the disclosure provides a vehicle controllable by an operator to perform various vehicle actions, the vehicle including an operation management system having a processor, a memory, and a human-machine interface. The processor is configured to receive a first sequence of a predetermined number of operator initiated vehicle actions, each operator initiated vehicle action corresponding to an operational response of the vehicle, receive a second sequence of the predetermined number of operator initiated vehicle actions, and compare the operator initiated vehicle actions of the first and second sequences. If the operator initiated vehicle actions of the second sequence correspond to the operator initiated vehicle actions of the first sequence, identify an operational sequence of the vehicle based on at least one of the first or second sequences.

In another aspect the disclosure provides an operation management system for a vehicle controllable by an operator to perform various vehicle actions, the system including a processor, a memory, and a human-machine interface. The processor is configured to receive a sequence of operator-initiated vehicle actions, compare the sequence to saved sequences in the memory, and if the sequence does not contain identical operator-initiated vehicle actions as the saved sequences, communicate, by way of the human-machine interface, to the operator of the vehicle the sequence.

In another aspect the disclosure provides a method of facilitating operation of a vehicle controllable by an operator to perform various vehicle actions. The method includes receiving a sequence of operator-initiated vehicle actions, comparing the sequence to saved sequences in the memory, and if the sequence does not contain the same operator-initiated vehicle actions as any of the saved sequences, communicating, by way of the human-machine interface, to the operator of the vehicle the sequence.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
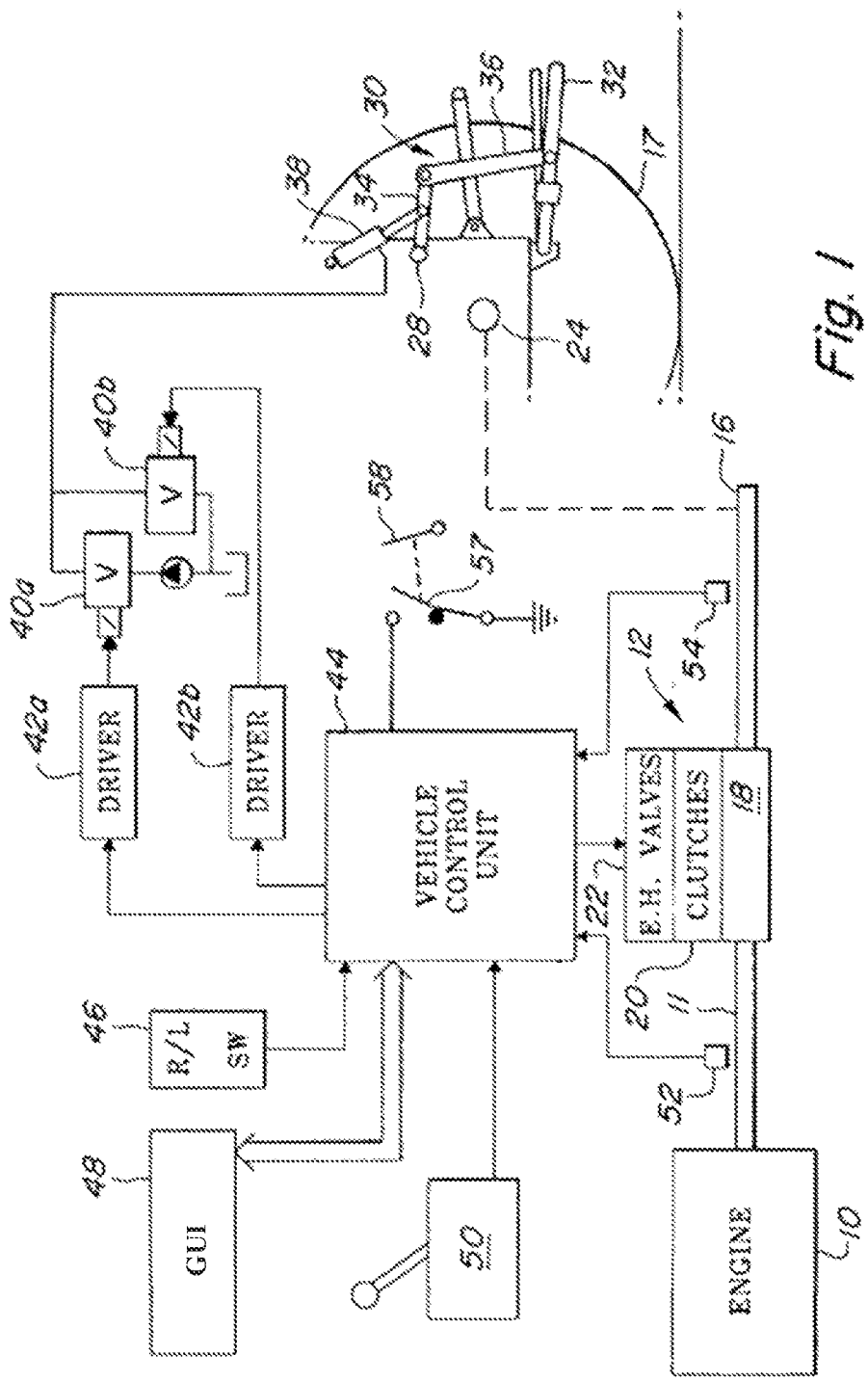
FIG. 1 is a schematic illustration of a vehicle and operation management system in accordance with the present disclosure.

Referring to FIG. 1, a vehicle, such as a production John Deere 8000 series tractor, includes an engine 10 which drives an engine output shaft 11, which drives a power shift transmission (PST) 12, which drives an output drive shaft 16 which is connected to drive wheels 17. The PST 12 includes a transmission 18 which may be operated by a set of pressure operated control elements or clutches 20 which are controlled by a corresponding set of solenoid operated proportional control valves 22. The PST may be the PST available on the production John Deere 8000 Series tractor, or any electronically controlled transmission. The valves 22 may be electrohydraulic valves, such as are also on the production John Deere 8000 Series tractor, or other suitable valves. The engine 10 also drives a conventional power take off (PTO) drive (not shown) via a PTO clutch (not shown), and drives a hydraulic pump (not shown) which supplies pressurized hydraulic fluid to selective control valves (not shown), all also as available on the production John Deere 8000 Series tractor. Such a tractor may also include a differential lock, a mechanical front wheel drive and electro-hydraulic depth control cylinders (not shown) may be part of an implement (not shown) pulled by the tractor.

An implement hitch 30, such as a conventional 3-point hitch, includes draft links 32 which are connected to lift arms 34 via lift links 36. The lift arms 34 are connected to a rockshaft 28 to ensure simultaneous and equal movement, and are raised and lowered via a pair of parallel connected hydraulic lift or rockshaft cylinders 38. The tractor portions and the hitch 30 are merely exemplary and those skilled in the art will understand that the disclosure can be applied to tractors and hitches of other configurations. As is well known, various ground-engaging implements (not shown), such as a moldboard plow or a chisel plow, may be attached in a conventional manner to the hitch 30.

In other constructions, the vehicle may include vehicles such as, but not limited to, dirt moving equipment, snow removal equipment, sand moving equipment, forestry harvesting equipment, agricultural equipment, cargo moving equipment, mining equipment, on highway equipment, automotive vehicles, other vehicles, etc. Accordingly, the hitch 30 may include other lift or movement mechanisms and other types of implements, such as blades, shovels, cutters, diggers, drills, impacters, rippers, hullers, scarifiers, front attachments, ploughs, sweepers, etc.

The PST 12, the hitch 30, the PTO drive (not shown), selective control valves (not shown), the differential lock (not shown), the mechanical front wheel drive (not shown) and electro-hydraulic depth control cylinders (not shown), and others associated with specific types of vehicles, are examples of various types of vehicle functions or actuators 62 which may be operated in desired sequences during operation of the vehicle, such as at the start or end of a crop row.

The communication of hydraulic fluid to and from the cylinders 38 is controlled by a pair of solenoid-operated electro-hydraulic flow control valves 40a and 40b which are operated by drivers 42a and 42b which receive electrical control signals generated by a vehicle control unit (VCU) 44. The VCU 44 is preferably a microprocessor-based electronic control unit, such as is used on the production John Deere 8000 Series tractor. The flow control valves 40a and 40b and the drivers 42a and 42b could be such as is available on the production John Deere 8000 Series tractor. The VCU 44 also preferably controls the differential lock (not shown), the mechanical front-wheel drive clutch (not shown), the PTO (not shown), selective control valves (SCVs) (not shown), all such as is available on the production John Deere 8000 Series tractor.

The VCU 44 may receive signals from a spring centered, three-position rocker type hitch raise/lower switch 46, a human-machine interface such as a graphical user interface (GUI) 48, and a shift lever unit 50, all such as is available on the production John Deere 8000 Series tractor. The human-machine interface may include other types of interfaces that allow the VCU 44 to communicate with the operator and the operator to communicate with the VCU 44, such as a screen with buttons, a touch screen, a display with other types of actuators, audio, voice recognition, etc. The VCU 44 also receives signals from an engine speed sensor 52, preferably a mag pick-up, and an axle speed sensor 54, preferably a Hall effect sensor, which supplies an axle speed signal. The sensors 52, 54 are preferably similar to their counterparts found on the production John Deere 8000 series tractors, but other commercially available components may also be employed. The VCU 44, such as is available on the production John Deere 8000 Series tractor, includes input and output circuits, a programmed microprocessor and memory (not shown). The VCU 44 also receives signals from a clutch switch 57, which is operatively connected to the clutch pedal 58. Collectively, the VCU 44 and all the vehicle components and communication components may be referred to herein as the operation management system.

The GUI 48 may include any suitable type of user interface, including hard-wired and wireless, fixed and portable. For example, the GUI 48 may be dedicated to communicate with one vehicle or portable between multiple vehicles to selectively communicate with a desired vehicle. The system may also have an export function such that the operator's saved sequences may be exported from one VCU 44 to another VCU 44 and displayed in the same way on any GUI 48. The GUI 48 may include a screen for displaying to the operator, or a touch screen for displaying and communicating to the operator and for receiving input from the operator. Thus, the VCU 44 communicates with the operator and the operator communicates with the VCU 44 by way of the GUI 48. Other types of displays, such as the display unit shown and described in U.S. Pat. No. 6,292,729 may be employed, the entire contents of which are incorporated by reference herein.

To implement the present system and method, the VCU 44 executes a program, as described below and shown in the figures, for managing operation of the vehicle. The VCU 44 may derive distance information from the speed sensor 54 by integrating the speed using well known integration techniques. The VCU 44 may also derive distance information from a global positioning system (GPS), from other types of sensors, or may employ other suitable methods. The programmed VCU 44 cooperates with the operator and the elements shown in FIGS. 1 and 2 and thereby implements the operation management system.

During operation of the vehicle, the operator performs actions to execute vehicle functions (such as actuating the implement, the PTO, moving the vehicle over terrain, etc., as described above). Generally speaking, the operator actions are the actions taken by the operator to influence a change in the vehicle's configuration or operation/actions. The VCU 44 detects parameters, called actions, such as direction (e.g., lift or lower of the implement), turn on/off (e.g., turning on or off of the PTO), speed (e.g., speed of vehicle travel), position, gear mode, extend, retract, float, initiate, cancel, engage, etc., associated with each function. Each corresponding pair of function and associated action may be referred to herein as a function/action, or function/action pair. The VCU 44 also detects, or calculates, a distance associated with each function/action, such as for example a distance between each function/action. Thus, a function/action signal is emitted when the operator performs an action. Vehicle functions or actions controlled by the operator may be more generally referred to herein as operator-initiated vehicle actions.

Figure 2:
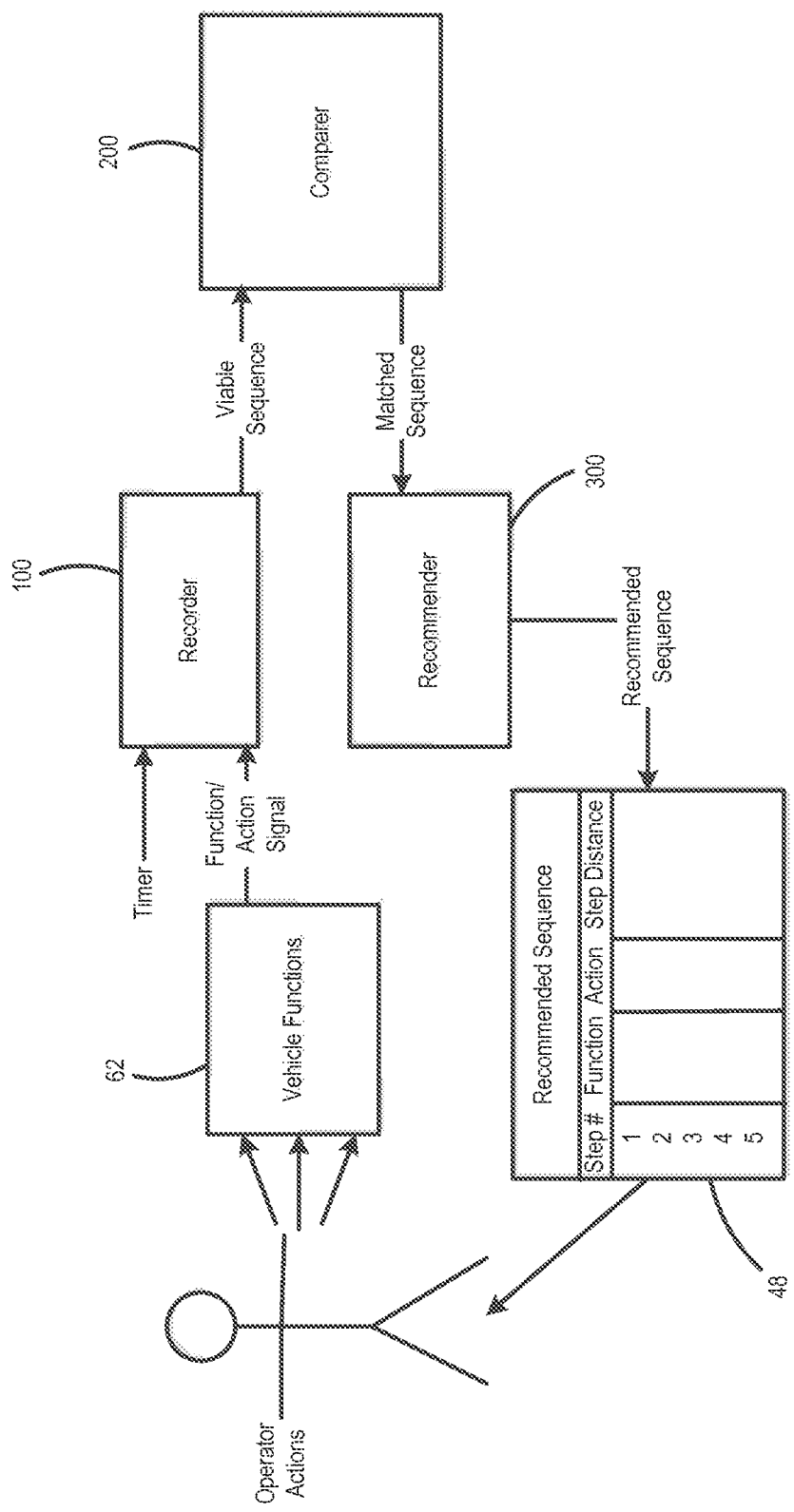
FIG. 2 is a flow chart illustrating the operation management system having a recorder, a comparer, and a recommender.

Referring to FIG. 2, the VCU 44 (which also may be referred to herein as the operation management system) includes a recorder 100 receiving the function/action 62 signals, a comparer 200 in communication with the recorder 100, and a recommender 300 in communication with the comparer 200. The recommender 300 sends signals, data, and/or dialog to the GUI 48 for communication to the operator.

Figure 3:
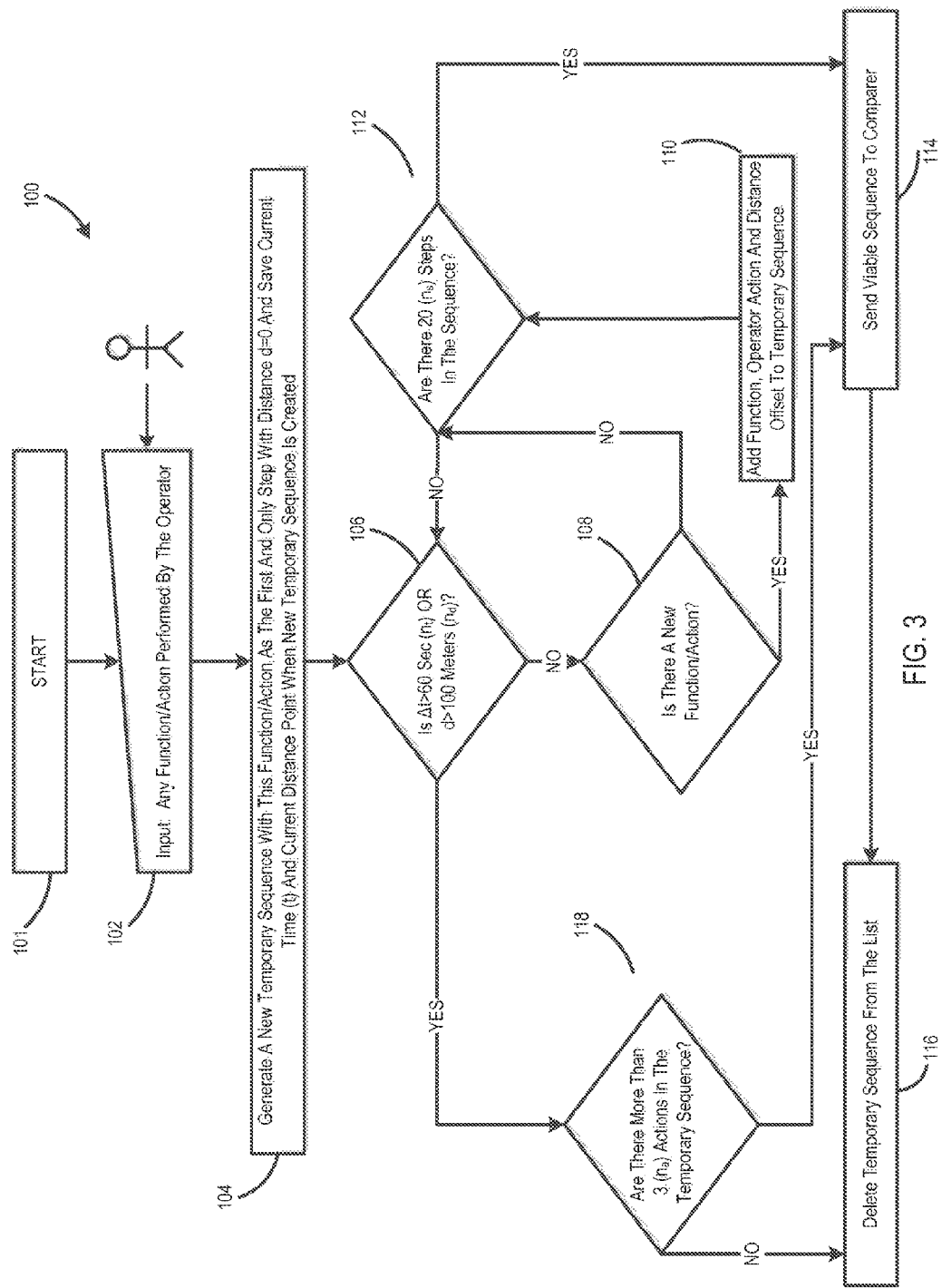
FIG. 3 is a flow chart illustrating the recorder.

FIG. 3 illustrates an algorithm for the recorder 100. With reference to FIG. 3, in general the recorder 100 receives signals representing the previously described parameters or actions (function/actions). The recorder 100 includes a timer, which may represent a current time (e.g., a date and time on a 24-hour scale) in increments of half seconds or other suitable time intervals or sampling rates. In other constructions, the timer may be a stop/start timer recording time in increments of half seconds relative to a reference point, and may have both date/time functionality and stop/start functionality. For example, time may be tracked as a time delta ($\Delta t$) relative to a time at which an individual action signal is received. The timer may have other resolutions, such as every quarter second, every second, every several seconds, etc.

The recorder 100 may run continuously from vehicle startup and start recording sequences at step 101 when any function/action is performed by the operator. In other constructions, the recorder 100 may start and run only when enabled by the operator and may be enabled after vehicle startup, or not enabled at all.

An input starts a temporary sequence at step 102. The input may include an operator-initiated action (e.g., a function/action), an automatic condition to start the sequence, or any other input that may be desired for potential future playback. Each function/action pair is a step in a sequence. The steps in a sequence may be numbered in an order, e.g., starting with 0 or 1 and increasing incrementally by whole numbers based on the order in which they occur, as shown schematically in the GUI 48 in FIG. 2. Thus, at step 102, an input is received.

At step 104, every new input or function/action starts a new temporary sequence in the recorder 100, with the new function/action as the first and only step with an associated distance d=0, an associated current time t, and a current distance point when the new temporary sequence is generated. Furthermore, every new function/action is added to all preexisting temporary sequences in the list. For example, after five function/actions there are five temporary sequences active with the oldest having five steps and the newest only having one step.

The recorder 100 records sequences of function/action pairs and distances associated with each function/action pair in each sequence, such as for example distances between the function/action pairs. The distances are measured with respect to a previous function/action in the sequence. Preferably, the distances are each measured with reference to the beginning of the sequence, such that the first function/action is distance d=0 and each subsequent function/action is associated with a distance d measured from the first function/action in the sequence. In other constructions, the distances d may be measured from each respective immediately previous function/action, or relative to another reference point or series of reference points, or in another manner as desired.

Every temporary sequence progresses through the recorder 100 logic shown in FIG. 3 simultaneously. Time delta and distance d are continuously tracked for each temporary sequence. At step 106, which may occur every 100 milliseconds (or other suitable recurring time), the recorder 100 determines whether either 1) time delta is greater than time threshold $n_t$ or 2) distance d is greater than distance threshold $n_d$. The time threshold $n_t$ may be 60 seconds, as shown in FIG. 3. In other constructions, the time threshold $n_t$ may other desired values, such as 90 seconds, 2 minutes, several minutes, etc. The distance threshold $n_d$ may be 100 meters (328 feet), as shown in FIG. 3. In other constructions, the distance threshold $n_d$ may be other desired values, such as 50 meters (164 feet), 150 meters (492 feet), 200 meters (656 feet), etc.

If time delta is not greater than $n_t$ or if distance d is not less than $n_d$ ("NO" at step 106), then the recorder 100 looks for a new function/action to add to the temporary sequence at step 108. If there is no new function/action ("NO" at step 108), then the recorder 100 moves back to step 106 to determine whether either the time threshold or distance threshold has been reached. If not ("NO" at step 106), the recorder 100 returns to step 108. The recorder 100 continues waiting for a new function/action until one of the time or distance thresholds has been met or until a new function/action is received.

If a new function/action is received ("YES" at step 108), then the new function/action is added to the temporary sequence along with an associated distance offset at step 110. The new function/action also starts a new temporary sequence at step 102 and is added to all existing temporary sequences, as previously described. Then, at step 112, the recorder 100 determines whether there are $n_s$ steps in the sequence, i.e., whether the temporary sequence has reached a predetermined number of steps, or step threshold $n_s$. The step threshold $n_s$ may be 20 steps, as illustrated in FIG. 3. In other constructions, the step threshold may be other values, such as 15 steps, 25 steps, etc., or other numbers of steps depending on the amount of memory, the complexity of operation in a particular application for a particular type of vehicle, etc.

If the temporary sequence has reached the step threshold ("YES" at step 112), then the temporary sequence is determined to be a viable sequence and the recorder 100 sends the viable sequence to the comparer 200 at step 114. Then, at step 116, the viable sequence is deleted from the list of temporary sequences. If, on the other hand, the temporary sequence has not reached the step threshold ("NO" at step 112), then the recorder 100 returns to step 106.

At step 106, if the time delta is greater than the time threshold or the distance d is greater than the distance threshold ("YES" at step 106), then the recorder 100 determines whether there are more than $n_a$ actions in the temporary sequence at step 118, i.e., whether there are a predetermined number of actions $n_a$. In the illustrated construction, the predetermined number of actions $n_a$ is 3. However, in other constructions, the predetermined number of actions $n_a$ may be any other desired value representing a sequence worth comparing in the comparer 200. If there are more than $n_a$ actions in the temporary sequence ("YES" at step 118), then the temporary sequence is determined to be a viable sequence and is sent to the comparer 200 at step 114. If there are not more than $n_a$ actions in the temporary sequence ("NO" at step 118), then the temporary sequence is deleted from the list at step 116. Thus, the recorder 100 effectively ends a temporary sequence if the time delta is greater than the time threshold or if the distance d is greater than the distance threshold and then decides whether the temporary sequence is viable for sending to the comparer 200 or should be deleted.

The recorder 100 maintains the list of temporary sequences and preferably will only maintain the predetermined number of temporary sequences. For example, the predetermined number may be a maximum of 20 sequences. In other constructions, the predetermined number may be any suitable value, depending on the amount of memory or the speed of the processor, for example. If the predetermined number of sequences is exceeded, the recorder 100 deletes the oldest temporary sequence in the list.

As such, the recorder 100 identifies a temporary sequence as a viable sequence to send to the comparer 200 if the temporary sequence is executed within a predetermined time period and within a predetermined distance and includes a predetermined number of steps. In the illustrated construction, the recorder 100 passes a temporary sequence on to the comparer 200 if it receives the 20th action for that sequence before exceeding 100 meters of distance or 60 seconds of time. The system defines a sequence as 20 or fewer steps within 100 meters of distance that can execute within 60 seconds of time. Other variations may be employed.

The recorder 100 logic for one preferred construction is also summarized in Table 1 below.

TABLE 1

| RECORDER 100 | |
|---|---|
| Maintain the list of 'Temporary Sequences' (max 20) | |
| Track distance traveled and time | |
| Every ½ second | Add time delta since last run to 'current time' |
| | Integrate 'current speed' for 'current distance' value |
| | Check all 'Temporary Sequences' for (>=100 m) || (>=60 seconds), |
| | IF TRUE then IF 'Temporary Sequence' has (>=3 steps) then EMIT as 'Viable Sequence' and delete ELSE just delete |
| On receiving a new 'Function/Action' | |
| | Create a new 'Temporary Sequence' with this 'Function/Action' as the first and only step with distance = 0 |
| | Save 'Current time' and 'current distance' point when new 'Temporary Sequence' is created |
| | Also, add new 'Function/Action' to each 'Temporary Sequence' with distance offset from start of sequence distance |
| | IF 'Temporary Sequence' now has (==20) steps then EMIT as 'Viable Sequence' and delete |
| EMITS new 'Viable Sequence' | |

Figure 4:
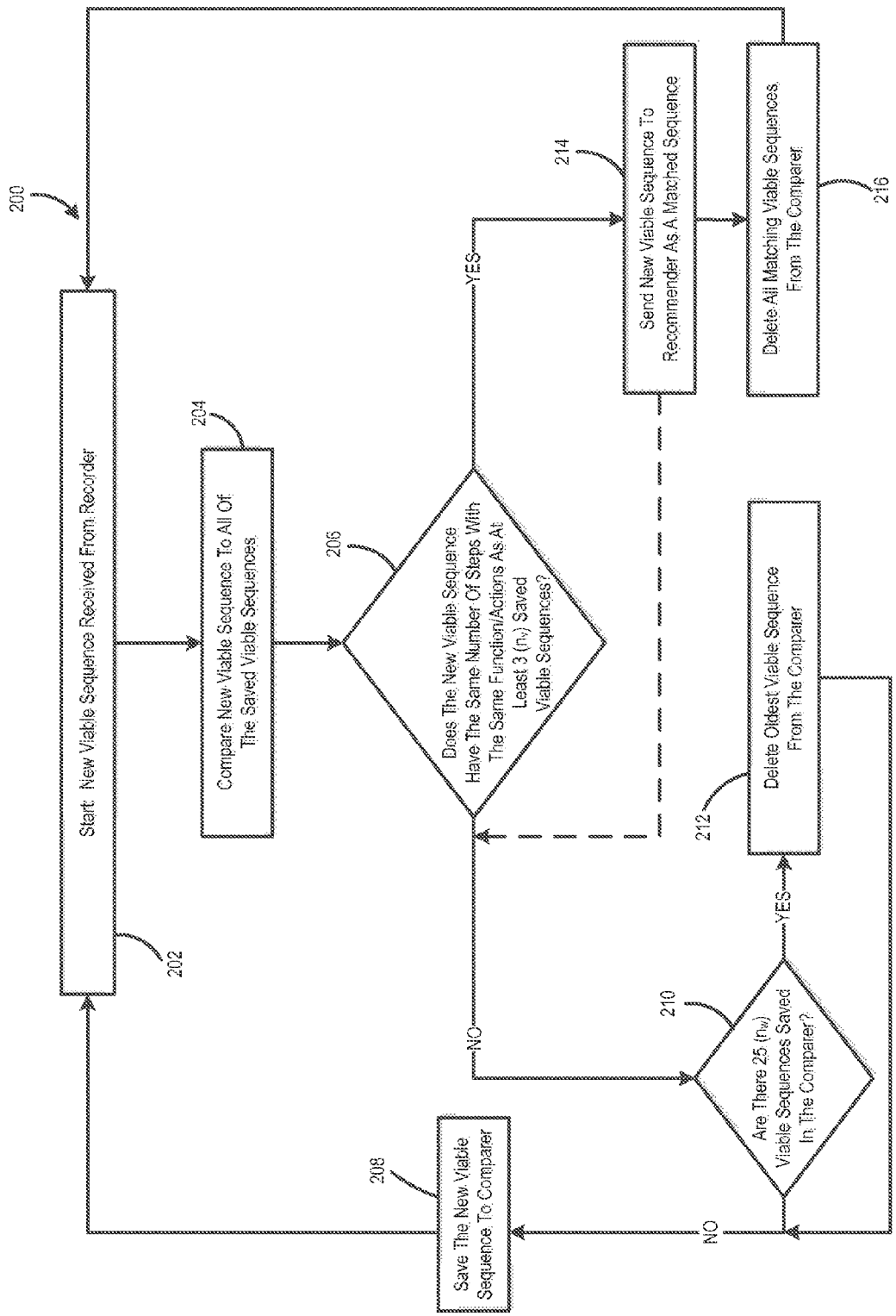
FIG. 4 is a flow chart illustrating the comparer.

FIG. 4 illustrates the comparer 200. The comparer 200 receives viable sequences from the recorder 100 at step 202 and maintains a list of the viable sequences, which may be referred to herein as saved viable sequences. At vehicle startup, the list of viable sequences is empty. On receiving a new viable sequence from the recorder 100, the comparer 200 determines the function/action pairs in the new viable sequence. At step 204, the comparer 200 compares the new viable sequence to the saved viable sequences. Specifically, the comparer 200 compares the function/action pairs in the new viable sequence with the function/action pairs in the saved viable sequences. Preferably, the comparer 200 compares the new viable sequence to all of the saved viable sequences; however, in other constructions the comparer 200 may only compare the new viable sequence to some of the saved viable sequences at step 204. Then, the comparer 200 determines whether the new viable sequence has the same number of steps and the same function/actions as a predetermined threshold of viable sequences, e.g., at least $n_v$ saved viable sequences at step 206. Thus, $n_v$ is the number of saved viable sequences that match the new viable sequence required to identify the new viable sequence as a match. In the illustrated construction, $n_v=3$. In other constructions $n_v$ may include other values as long as the new viable sequence is required to match at least one of the saved sequences. As such, $n_v$ could be 1, 2, 4, 5, or any other integer greater than 1.

In a preferred construction, for a saved viable sequence to match the new viable sequence at step 206, all function/action pairs must exist in both sequences. Preferably, no extra function/action pairs may exist in either sequence. However, in other constructions, some extra function/action pairs may exist and be eliminated or ignored for being attributed by the comparer 200 as random or extraneous function/actions such that matches can be made even if extra function/action pairs exist. Thus, the new viable sequence must merely correspond with a saved viable sequence to match. Function/actions in which the functions correspond but the actions are opposite (e.g., lift hitch instead of lower hitch), do not equate to a match. Furthermore, the order in which the function/actions occur (e.g., the location of the steps in the sequence) does not matter for the comparison. However, in other constructions, the order of the function/actions may be taken into consideration, required to match to some degree, or required to exactly match. The distance value recorded in association with each function/action is preferably ignored for the purposes of comparison by the comparer 200. However, in other constructions, the distance value may be taken into consideration, required to match to a degree, or required to exactly match.

If the new viable sequence fails to match at least $n_v$ saved viable sequences ("NO" at step 206), then at step 210, the comparer 200 determines whether there are $n_w$ viable sequences saved in the comparer 200. If there are ("YES" at step 210), then the oldest saved viable sequence is deleted from the comparer 200 at step 212 and the new viable sequence is saved to the comparer 200 in the list of saved viable sequences at step 208 to potentially be matched with another sequence later. If not ("NO" at step 210), then the new viable sequence is saved to the comparer 200 in the list of saved viable sequences at step 208. Then, the comparer 200 returns to step 202 and awaits a new viable sequence. In the illustrated construction, $n_w$=25 such that the number of saved viable sequences in the comparer 200 does not exceed 25. In other constructions, $n_w$ may have another suitable value, depending on the amount of memory available, the speed of the processor, or the specifics of a particular application, for example. Thus, the comparer 200 maintains a maximum number of saved viable sequences in the list.

If the new viable sequence matches at least $n_v$ saved viable sequences ("YES" at step 206), then the comparer 200 identifies a matched sequence based on at least one of the matching viable sequences and sends the matched sequence to the recommender 300 at step 214. Preferably, the new viable sequence is identified as the matched sequence to be sent to the recommender 300 at step 214. It is also possible for the comparer 200 to identify one of the other matching saved viable sequences as the matched sequence to send to the recommender 300 at step 214. The comparer 200 may also manipulate one or more of the matching viable sequences to identify the matched sequence to be sent to the recommender 300 at step 214, e.g., averaging the distances of the matching viable sequences, rearranging or merging the steps in one or more of the matching viable sequences, etc. The matched sequence is sent to the recommender 300 as a possible sequence to recommend to the operator. When the comparer 200 finds matching sequences, this is an indication that the operator is doing a repetitive task with the vehicle and could benefit from the automation that the operation management system provides.

After the matched sequence is sent to the recommender 300, all of the matching viable sequences, including the new viable sequence that was matched and the saved viable sequences matched therewith, are deleted from the comparer 200 at step 216, and the comparer 200 returns to step 202 to await a new viable sequence. Optionally, the comparer 200 may additionally return to step 208, as shown in broken lines in FIG. 4, and save the new viable sequence. However, it may be preferable to clear the memory as much as possible by deleting all of the matching viable sequences from the comparer 200 as there may be little value in using space to save and compare viable sequences that have already matched.

The comparer 200 logic for one preferred construction is also summarized in Table 2 below.

TABLE 2

COMPARER 200

| | |
|---|---|
| Maintain the list of 'Viable Sequences' (max 25) | |
| On receiving a new 'Viable Sequence' | Determine 'function/action pairs' in new 'Viable Sequence' Compare 'function/action pairs' in all current 'Viable Sequences' IF new function/action pairs' list matches at least (>=3) other Viable Sequence's 'function/action pairs' then EMIT as 'Recommend Sequence' IF recommending then delete all matching viable sequences IF not recommending then delete oldest 'Viable Sequence' and save new 'Viable Sequence' in list of 'Viable Sequences' if list is full |
| EMITs new Matched Sequence For two sequences to match: | |
| | All function/action pairs must exist in both sequences No extra function/action pairs may exist in either sequence No function/opposite actions may exist in either sequence Order of function/actions doesn't matter for comparison Function/action + distance value is a 'step' in the sequence, distances are ignored for comparison |

Figure 5:
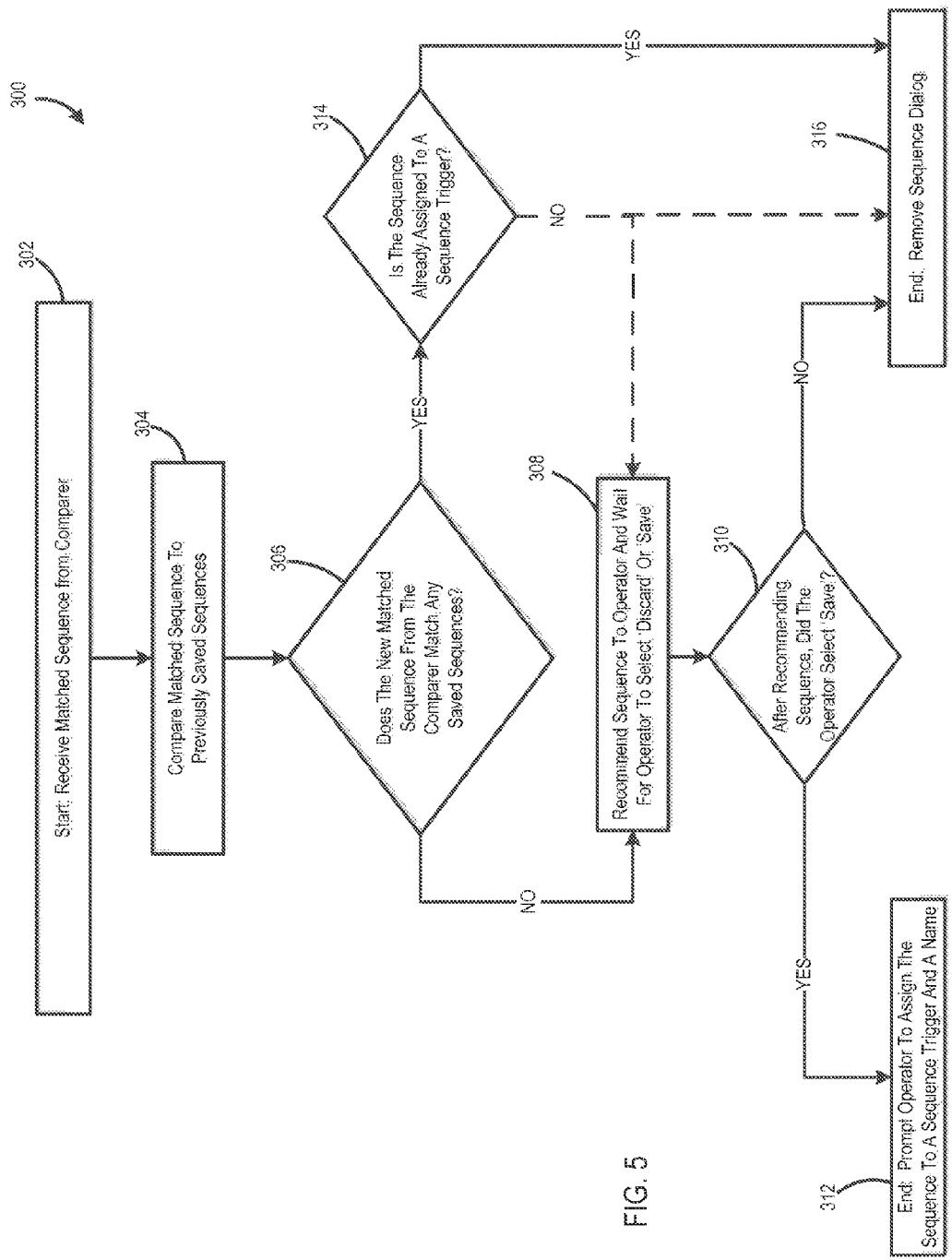
FIG. 5 is a flow chart illustrating the recommender.

FIG. 5 illustrates the recommender 300. With reference to FIG. 5, the recommender 300 receives matched sequences from the comparer 200 at step 302. When the recommender 300 receives a matched sequence from the comparer 200, the recommender 300 compares the matched sequence to previously saved sequences at step 304. The saved sequences include sequences that have been saved in the operation management system by the operator for future execution (whether in response to previous recommendations or by manual entry) and previous sequences that were recommended to the operator but discarded by the operator. Then, at step 306, the recommender 300 determines whether the matched sequence matches any of the saved sequences. The conditions for determining whether the matched sequence matches any of the saved sequences may be the same as or similar to the conditions in the comparer 200 for determining a match.

If the matched sequence does not match one of the saved sequences ("NO" at step 306), then the recommender 300 recommends a recommended sequence to the operator at step 308. The recommended sequence is preferably the matched sequence. However, the recommended sequence may be a modified or manipulated version of the matched sequence received from the comparer 200. The recommended sequence is communicated to the operator by way of the GUI 48 along with a request for the operator to select 'discard' or 'save'. At step 310, the recommender 300 determines whether the operator selects 'save' or 'discard'. If the operator selects 'save' ("YES" at step 310), then the recommender 300 saves the sequence to the operation management system as a selected sequence and prompts the operator at step 312 to assign the selected sequence to a sequence trigger and a name. The selected sequence also becomes one of the saved sequences in the operation management system for future comparisons (e.g., at step 306).

The sequence trigger is a physical actuator, button, or automatic condition that starts the selected sequence. For example, when the operator wants to replay a saved sequence, the operator may actuate the predetermined button or actuator in the vehicle to act as the sequence trigger to start the sequence. The selected sequence may also replay automatically in response to an automatic condition assigned as the sequence trigger. The operator may also select the saved sequence by way of the GUI 48 and press a button, or touch screen, to replay the saved sequence. The name is a set of characters identifying the sequence to the operator for future reference.

If the operator does not select 'save' (i.e., selects 'discard') ("NO" at step 310), then the recommender 300 removes the sequence dialog at step 316. The matched sequence is nevertheless saved in the operation management system as one of the saved sequences for future matched sequences to be compared to at step 306, though the saved matched sequence is not visible to the operator by way of the GUI 48 as a saved sequence or, at least, is not listed in the operator's list of selected sequences.

If the new matched sequence matches one of the saved sequences ("YES" at step 306), then the recommender 300 determines whether the matching saved sequence has already been assigned to a sequence trigger at step 314. If the matching saved sequence has already been assigned to a sequence trigger ("YES" at step 314), this means that the operator has actively chosen to save this sequence in the operation management system and there is no need to recommend the sequence to the operator again. As such, the sequence is removed from the recommender 300 at step 316 and no dialog or recommendation is presented to the operator.

If the matching saved sequence has not been assigned to a sequence trigger ("NO" at step 314), then this means the operator was previously presented with this sequence and chose to discard this sequence. To avoid repeating recommendations, it may be desirable to move to step 316 and delete the matched sequence with no dialog or recommendation being presented to the operator (shown as optional in FIG. 5 by broken lines). However, it may be desirable to recommend the sequence to the operator again and prompt the operator to discard or save the sequence at step 308 (shown as optional in FIG. 5 by broken lines). The number of repetitive recommendations like this may be counted and a threshold level of repetitions may be set to allow the recommender 300 to recommend a duplicative sequence only a certain number of times. When the threshold level of repetitions has been met, then the recommender 300 moves straight to step 316.

The recommender 300 logic for one preferred construction is also summarized in Table 3 below.

TABLE 3

| RECOMMENDER 300 | |
| --- | --- |
| On receiving a new 'Matched Sequence' | |
| | IF new 'Matched Sequence' already matches a 'Saved Sequence' then recommend the Saved Sequence |

TABLE 3-continued

| RECOMMENDER 300 | |
| --- | --- |
| | IF 'Discard' is pressed then remove dialog ELSE IF 'Save is pressed then ask to assign 'Saved Sequence' to a trigger if it isn't already ELSE recommend the new 'Matched Sequence' IF 'Discard' is pressed then remove dialog ELSE IF 'Save is pressed then ask to assign 'Saved Sequence' to a trigger and ask for 'sequence name' |
| CREATE new 'Matched Sequence' dialog | |

As such, the recommender 300 decides whether to communicate with the operator by way of the GUI 48 to recommend to the operator a sequence that the operator may want to use or replay in the future. The selected sequence may be editable such that the operator may fine tune the sequence (e.g., edit the distances, times, functions, actions, order of steps, etc.) before replaying the sequence. Thus, the operation management system automatically detects and recommends a sequence that the operator may want to use, or tweak for future use, thereby saving the operator the trouble of configuring the system for recording a sequence and manually entering or recording the sequence.

During replay of a saved sequence, the operator may manually override the replaying sequence at any time. The system may exit replaying the sequence upon manual override, or may resume replaying the sequence upon completion of the operator's manual override.

While the present disclosure has been described in conjunction with one or more specific constructions, it is understood that many alternatives, modifications and variations will be apparent to those skilled in the art in light of the foregoing description. For example, the operation management system described herein can also have algorithms arranged in other ways, having steps in different orders, having fewer or more steps, etc. Accordingly, this disclosure is intended to embrace all such alternatives, modifications and variations which fall within the spirit and scope of the appended claims.

Thus, the disclosure provides, among other things, an operation management system that records a new sequence of operator-initiated vehicle actions for each new operator-initiated vehicle action and monitors the repetitive similar vehicle actions looking for common sets of actions. When a common sequence is detected, the common sequence (or a sequence based on the common sequence) is presented to the operator as a possible sequence that he or she may want to save and/or repeat and possibly edit. Various features and advantages of the disclosure are set forth in the following claims.

What is claimed is:

1. An operation management system for a vehicle controllable by an operator to perform various vehicle actions, the system including a processor, a memory, and a human-machine interface, the processor configured to:
   record sequences of operator-initiated vehicle actions into the memory;
   compare the sequences;
   if at least two of the sequences contain the same operator-initiated vehicle actions, identify the at least two of the sequences as matching sequences; and communicate, by way of the human-machine interface, to the operator of the vehicle a suggested operating sequence based on the matching sequences, wherein the suggested operating sequence is selectable by the operator by way of the human-machine interface.

2. The operation management system of claim 1, the processor further configured to automatically execute the suggested operating sequence if the operator selects the suggested operating sequence by way of the human-machine interface.

3. The operation management system of claim 1, wherein the at least two of the sequences contain the same operator-initiated vehicle actions in the same order.

4. The operation management system of claim 1, wherein the at least two of the sequences contain the same operator-initiated vehicle actions in a different order.

5. A method of facilitating operation of a vehicle controllable by an operator to perform various vehicle actions, the method comprising:

recording sequences of operator-initiated vehicle actions into the memory;

comparing the sequences;

if two or more of the sequences contain the same operator-initiated vehicle actions, identifying the two or more of the sequences as matching sequences; and communicating, by way of the human-machine interface, to the operator of the vehicle a suggested operating sequence based on the matching sequences, wherein the suggested operating sequence is selectable by the operator by way of the human-machine interface.

6. The method of claim 5, further comprising automatically executing the suggested operating sequence if the operator selects the suggested operating sequence by way of the human-machine interface.

7. The operation management system of claim 5, wherein the two or more of the sequences contain the same operator-initiated vehicle actions in the same order.

8. The operation management system of claim 5, wherein the two or more of the sequences contain the same operator-initiated vehicle actions in a different order.

* * * * *